Figure 1:
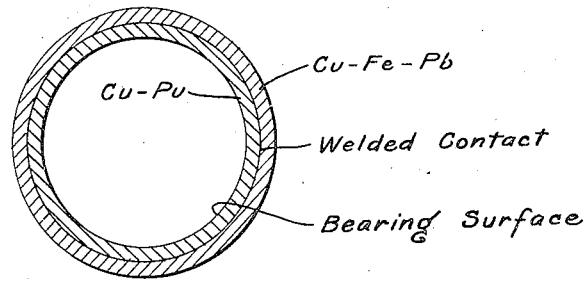

July 15, 1930.  R. D. PIKE  1,770,582
BUSHING
Filed July 9, 1928

INVENTOR.
Robert D. Pike.
BY Townsend, Loftus & Abbett
ATTORNEYS.

Patented July 15, 1930

1,770,582

UNITED STATES PATENT OFFICE

ROBERT D. PIKE, OF PIEDMONT, CALIFORNIA, ASSIGNOR TO KALIF CORPORATION, OF EMERYVILLE, CALIFORNIA, A CORPORATION OF DELAWARE

BUSHING

Application filed July 9, 1928. Serial No. 291,459.

My present invention relates to bearing bushings and has for its object the provision of a bushing having new, novel, and useful characteristics.

Another object of my invention is to provide a novel method whereby the alloys contemplated by my bushing may be practically and effectively united.

Both practice and laboratory tests have shown that the higher grade anti-friction metals are relatively soft and lacking in both tensile and compressive strength. Babbitt is a well known, high grade bearing metal, and recognition of the above fact has led to a well established practice for making bushings of an outer shell of bronze, for example, containing 80% copper, 10% tin and 10% lead, with an inner shell of babbitt securely sweated onto the inner face of the bronze bushing. The function of the bronze is two-fold, (1) it supports the babbitt and (2) it provides a plastic buffer between the babbitt and the steel supporting member. Recent experiments performed by me show that babbitt should be supported by a relatively soft, plastic metal, particularly when the babbitt shell is thin. If the thin shell of babbitt is supported by a stiff steel bushing, there is a greater tendency for the bearing to heat up in service, than is the case when the thin layer of babbitt is supported by a plastic ring of metal which can absorb the journal vibrations without undue heating. This shows that a recent tendency to cast very thin shells of babbitt inside of connecting rod bearings of high speed gas engines is based upon a wrong principle. Another bearing metal which possesses the highest grade anti-friction properties is an alloy of copper and lead, usually containing 75% of copper and 25% of lead. Some difficulty arises in practice in making macroscopically non-segregated castings of copper and lead, but it can be done with proper precautions and, probably, the best known way for accomplishing this is by the use of centrifugal casting.

These copper-lead alloys are, like babbitt, physically weak and on this account, do not alone make suitable bearing bushings.

In a concurrently filed application for Letters Patent entitled "Alloy," Serial Number 291,458, I disclose an alloy of copper, iron and lead, which is particularly applicable to my present invention. I have discovered that if I cast an alloy of this type into a centrifugal casting machine of well known suitable design, and if, before the inner surface of this casting has completely solidified, I pour in some of the copper-lead alloy, the latter, forming the inner shell, will become securely welded to the outer shell of the stiffer copper-iron-lead alloy. I thus produce a virtual one-piece bearing bushing, which possesses an inner shell of the excellent anti-friction alloy, copper-lead, and an outer supporting shell of the stiffer, though relatively plastic metal, copper-iron-lead. After machining and assembling, this bushing makes a bearing bushing of the finest type, which is designed upon correct, scientific principles, and which can be directly employed in the main shaft bearings and connecting rod bearings of high speed, high duty gas engines. These bearings cost less and will give longer life than present available bearings made from babbitt, backed by bronze.

For the purpose of facilitating an explanation of my present invention, I have prepared a drawing which illustrates the construction of my bushing. In this drawing the views are in section. In Figure 1 I show a bushing or shell which may be made suitably of an alloy containing copper 60%, iron 38%, lead 2%; or, copper 60% iron 35% lead 5%; or copper 69%, iron 18%, lead 13%; or from intermediate compositions, as covered by the above mentioned concurrently filed application for Letters Patent. The inner shell is preferably made of an alloy containing 75% copper and 25% lead, although considerable variation in this latter analysis is permissible.

Figure 2:
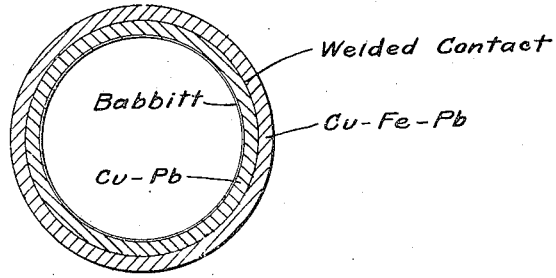

A variation of my invention is shown in Figure 2. This is the same bushing shown in Figure 1, except there is sweated onto the inside surface of the copper-lead alloy a very thin shell of babbitt, usually about .015 of an inch thick. The copper-lead alloy is actually a better anti-friction metal than the babbitt, and the only reason for using the latter is to provide an easily melting alloy which will give way, if lubrication fails, before anything more serious can happen to the engine. I have found that when a thin shell of babbitt is thus supported by another soft and plastic metal like the copper-lead alloy, it enjoys superior advantages as an anti-friction metal.

As a result of my invention, I am able to produce bearing bushings which possess better anti-friction properties and at a lower cost than is now possible.

In the claims, wherever I employ the words "copper-iron-lead", I refer to an alloy of variable composition, as covered in my concurrently filed application above referred to, and which may also contain relatively small amounts of other metals; and when I refer to the alloy "copper-lead" I refer to an alloy which usually contains 75% copper and 25% lead, but whose composition may vary as between copper and lead over a considerable range and which may also contain relatively small amounts of other metals. Wherever the word "babbitt" is used, I refer to white anti-friction metals either of the high tin or high lead series.

While I have shown the preferred form of my invention as now known to me, it is to be understood that various changes may be made in its construction without departing from the spirit of the invention as defined in the appended claims.

Having thus described my invention, what I claim and desire to secure by Letters Patent is—

1. A bushing composed of an outer shell of copper-iron-lead alloy, and an inner shell of copper-lead alloy, the two shells being welded together at their faces of contact to form a virtually one-piece bushing.

2. A bushing composed of an outer shell of copper-iron-lead alloy, an inner shell of copper-lead alloy welded thereto at their faces of contact to form a virtually one-piece bushing, and having secured onto its inner face a thin shell of babbitt.

3. As an article of manufacture, a bushing comprised of a layer of relatively infusible copper-lead alloy welded to a backing of stronger supporting metal.

4. As an article of manufacture, a bushing comprised of a layer of relatively infusible copper-lead alloy cast into welded engagement with a back of stiffer metal, having a copper base.

5. As an article of manufacture, a bushing comprised of a layer of relatively infusible copper-lead alloy cast into welded engagement with a backing of stiffer metal, having substantially the same coefficient of thermal expansion as the copper-lead alloy.

6. A bushing comprised of a layer of relatively infusible copper-lead alloy welded to a backing of stronger supporting metal, said alloy and said supporting metal having substantially the same thermal coefficient of expansion.

ROBERT D. PIKE.

DISCLAIMER 1,770,582.—*Robert D. Pike*, Piedmont, Calif. BUSHING. Patent dated July 15, 1930. Disclaimer filed March 15, 1933, by the assignee, *Kalif Corporation*.

Hereby enters this disclaimer to that part of the claim in said specification, namely, claim 3, which is in the following words, to-wit:

"3. As an article of manufacture, a bushing comprised of a layer of relatively infusible copper-lead alloy welded to a backing of stronger supporting metal."

except when the backing of stronger supporting metal mentioned in said claim consists of an alloy of copper.

[*Official Gazette April 11, 1933.*]